(12) United States Patent
Wright

(10) Patent No.: US 12,255,988 B2
(45) Date of Patent: Mar. 18, 2025

(54) COMPUTER-IMPLEMENTED SYSTEM AND METHOD FOR DISTRIBUTING SHARES OF DIGITALLY SIGNED DATA

(71) Applicant: nChain Licensing AG, Zug (CH)

(72) Inventor: Craig Steven Wright, London (GB)

(73) Assignee: NCHAIN LICENSING AG, Zug (CH)

( * ) Notice: Subject to any disclaimer, the term of this patent is extended or adjusted under 35 U.S.C. 154(b) by 0 days.

(21) Appl. No.: 18/626,043

(22) Filed: Apr. 3, 2024

(65) Prior Publication Data
US 2024/0380578 A1 Nov. 14, 2024

Related U.S. Application Data

(63) Continuation of application No. 17/288,844, filed as application No. PCT/IB2019/058902 on Oct. 18, 2019, now Pat. No. 11,979,492.

(30) Foreign Application Priority Data

Oct. 27, 2018 (GB) ..................................... 1817507

(51) Int. Cl.
*H04L 29/06* (2006.01)
*H04L 9/08* (2006.01)
(Continued)

(52) U.S. Cl.
CPC ............ *H04L 9/085* (2013.01); *H04L 9/3073* (2013.01); *H04L 9/3255* (2013.01); *H04L 9/50* (2022.05)

(58) Field of Classification Search
None
See application file for complete search history.

(56) References Cited

U.S. PATENT DOCUMENTS

| 7,239,701 B1 | 7/2007 | Ogishi et al. |
| 10,050,779 B2 | 8/2018 | Alness et al. |
| 2018/0241565 A1 | 8/2018 | Paolini-Subramanya et al. |

FOREIGN PATENT DOCUMENTS

EP    3511851 A1 *  7/2019  ......... G06F 16/9035

OTHER PUBLICATIONS

Shree et al., "Knapsack-based Elliptic Curve Cryptography Using Stern Series for Digital Signature Authentication", Emerging Trends in Electrical and Computer Technology, IEEE, Mar. 23, 2011, 4 pages. (Year: 2011).*

(Continued)

*Primary Examiner* — Andrew J Steinle
(74) *Attorney, Agent, or Firm* — Tarolli, Sundheim, Covell & Tummino LLP

(57) ABSTRACT

A computer-implemented method for distributing shares of a digitally signed message among a plurality of participants. The method comprising: inputting a digital message to an elliptic curve digital signature algorithm to provide a digital signature; mapping the digital signature to elliptic curve points of an elliptic curve cryptography system common to the participants. In a first encryption step, a knapsack algorithm is applied to the elliptic curve points to generate an encrypted version of the digital signature. In a second encryption step, an elliptic curve cryptography encryption is applied to the encrypted version of the digital signature to provide a doubly encrypted version of the digital signature; and applying a secret sharing step to the doubly encrypted version of the digital signature, wherein the digital signature is fragmented into a plurality of blocks before applying the knapsack algorithm.

8 Claims, 5 Drawing Sheets

(51) Int. Cl.
    *H04L 9/30*     (2006.01)
    *H04L 9/32*     (2006.01)
    *H04L 9/00*     (2022.01)

(56) References Cited

OTHER PUBLICATIONS

Knapsack-based Elliptic Curve Cryptography Using Stern Series for Digital Signature Authentication (Year: 2011).*
Antonopoulos et al., "Bitcoin Book," GitHub, retrieved from https://github.com/bitcoinbook/bitcoinbook, Jun. 8, 2017, 4 pages.
International Search Report and Written Opinion mailed Dec. 13, 2019, Patent Application No. PCT/IB2019/058902, 12 pages.
Nakamoto, "Bitcoin: A Peer-to-Peer Electronic Cash System," Bitcoin, Oct. 31, 2008, https://bitcoin.org/bitcoin.pdf, 9 pages.
Satoshi et al., "Connection Limits," Bitcoin Forum, Aug. 9, 2010, https://bitcointalk.org/index.php?topic=741.0;prev_next=prev, 2 pages.
Shree et al., "Knapsack-based Elliptic Curve Cryptography Using Stern Series for Digital Signature Authentication", Emerging Trends in Electrical and Computer Technology, IEEE, Mar. 23, 2011, 4 pages.
Tsai et al., "Multi-document threshold Signcryption Scheme", Security and Communication Networks, vol. 8., No. 13, Sep. 10, 2015, 14 page.
UK IPO Search Report mailed Mar. 7, 2019, Patent Application No. GB1817507.5, 3 pages.

\* cited by examiner

COMPUTER-IMPLEMENTED SYSTEM AND METHOD FOR DISTRIBUTING SHARES OF DIGITALLY SIGNED DATA

CROSS REFERENCE TO RELATED APPLICATIONS

This application is a continuation of U.S. patent application Ser. No. 17/288,844, filed Apr. 26, 2021, entitled "COMPUTER-IMPLEMENTED SYSTEM AND METHOD FOR DISTRIBUTING SHARES OF DIGITALLY SIGNED DATA," which is a 371 National Stage of International Patent Application No. PCT/IB2019/058902, filed Oct. 18, 2019, which claims priority to United Kingdom Patent Application No. 1817507.5, filed Oct. 27, 2018, the disclosures of which are incorporated herein by reference in their entirety.

BACKGROUND

This disclosure relates generally to secret sharing, and more particularly to distributing shares of digitally signed data. The disclosure is particularly suited, but not limited to, use in distributing shares of a signed blockchain transaction.

SUMMARY

In this document we use the term 'blockchain' to include all forms of electronic, computer-based, distributed ledgers. These include consensus-based blockchain and transaction-chain technologies, permissioned and un-permissioned ledgers, shared ledgers, and variations thereof. The most widely known application of blockchain technology is the Bitcoin ledger, although other blockchain implementations have been proposed and developed. While Bitcoin may be referred to herein for the purpose of convenience and illustration, it should be noted that the disclosure is not limited to use with the Bitcoin blockchain and alternative blockchain implementations and protocols fall within the scope of the present disclosure. The term "user" may refer herein to a human or a processor-based resource.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output.

Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated." Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluates to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e., added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g., a permanent, tamper proof records of events, distributed processing, etc.) while being more versatile in their applications.

Blockchain technology utilises secret sharing techniques in its implementation, for example to distribute shares of passwords or digital signatures to enable threshold signature of transactions.

Existing secret sharing techniques, for example threshold signature processes, do not scale well, since the private keys generated are packed into a data structure with little or no sorting or organisation.

It is therefore desirable to provide an improved secret sharing method which can be more efficiently scaled.

Such an improved solution has now been devised.

Thus, in accordance with the present disclosure there is provided a method as defined in the appended claims.

In accordance with the disclosure there may be provided a computer-implemented method of distributing a shared secret among a plurality of participants, the method comprising:

a first mapping step wherein a plurality of inputs to said first mapping step are mapped to respective elliptic curve points of an elliptic curve of an elliptic curve cryptography system common to the participants;

a first encryption step wherein a plurality of said elliptic curve points are encrypted by means of a public key of a public-private key pair of the elliptic curve cryptography system to provide an output adapted to be decrypted by means of the corresponding private key of the public-private key pair;

a second encryption step wherein a plurality of parts of at least one input to said second encryption step are multiplied by respective terms of a series known to said participants; and a secret sharing step wherein a plurality of shares of an input to said secret sharing step are distributed to a plurality of said participants such that said input is accessible to a threshold number of said shares and is inaccessible to less than said threshold number of said shares.

This provides the advantage of improved security, since the shared secret is disguised as elliptic curve points and is therefore more difficult for unauthorised parties to detect.

At least one input of said secret sharing step may be based on an output of said first encryption step or said second encryption step.

At least one input of said first encryption step may be based on a shared secret, at least one input of said second encryption step may be based on an output of said first encryption step, and at least one input of said secret sharing step may be based on an output of said second encryption step.

At least one input of said second encryption step may be based on a shared secret, at least one input of said first encryption step may be based on an output of said second encryption step, and at least one input of said secret sharing step may be based on an output of said first encryption step.

At least one input of said first encryption step may be based on an output of said secret sharing step or said second encryption step.

By carrying out the secret sharing step before at least one of the other steps, this provides the advantage of improving computational efficiency of the process.

At least one input of said secret sharing step may be based on a shared secret, at least one input of said second encryption step may be based on an output of said secret sharing step, and at least one input of first encryption step may be based on an output of said second encryption step.

At least one input of said second encryption step may be is based on a shared secret, at least one input of said secret sharing step may be based on an output of said second encryption step, and at least one input of first encryption step may be based on an output of said secret sharing step.

At least one input of said second encryption step may be based on an output of said secret sharing step or said first encryption step.

At least one input of said secret sharing step may be based on a shared secret, at least one input of said first encryption step may be based on an output of said secret sharing step, and at least one input of second encryption step may be based on an output of said first encryption step.

At least one input of said first encryption step may be based on a shared secret, at least one input of said secret sharing step may be based on an output of said first encryption step, and at least one input of said second encryption step may be based on an output of said secret sharing step.

The second encryption step may include carrying out a knapsack algorithm.

This provides the advantage of improving efficiency of the method.

The second encryption step may include a said series based on a Stern series.

This provides the advantage of greater efficiency by reducing time complexity to execute the algorithm.

The second encryption step may include a said series including powers of a term known to the participants.

The term may be based on a message shared between the participants.

The second encryption step may include a super increasing series.

This provides the advantage of enabling more efficient decryption of the shared secret.

The first mapping step may comprise determining an elliptic curve point having a coordinate based on said input.

The coordinate may be based on said input multiplied by a quantity known to the participants.

This provides the advantage of providing improved security.

The first encryption step may include determining a term comprising an elliptic curve point multiplied by an integer representing an input to said first encryption step.

Said first encryption step may include determining a term based on an ephemeral key and a public key of a participant.

The method may further comprise sending, to at least one participant, an elliptic curve point based on a generator point of the elliptic curve cryptography system multiplied by an ephemeral key, and elliptic curve point based on the public key of a participant multiplied by the ephemeral key.

The shared secret may be a digitally signed message.

The digitally signed message may be a blockchain transaction.

The disclosure also provides a system, comprising:
a processor; and
memory including executable instructions that, as a result of execution by the processor, causes the system to perform any embodiment of the computer-implemented method described herein.

The disclosure also provides a non-transitory computer-readable storage medium having stored thereon executable instructions that, as a result of being executed by a processor of a computer system, cause the computer system to at least perform an embodiment of the computer-implemented method described herein.

The present disclosure ensures confidentiality, authentication, non-repudiation as well as adding message recovery and convertibility in digital signatures. The disclosure allows for the secure transmission of data (such as a secret or even a log in script of a key). The disclosure also protects from attacks such as key-only attacks in banking systems and message attacks. Overall, embodiments of the disclosure relate to a process that allows for the incorporation of external information that relates to a Bitcoin transaction as well as messages for other uses.

The mechanisms for key distribution and efficient packing of key shares of embodiments of the disclosure introduce non-linearity in the process of storing key data which enhances the degree of security in the encryption protocol, by adding steps for diffusion and confusion. The efficient packing of the key shares also enables the solution to scale efficiently. The distributed nature of the key share enables operational models that include ESCROW services, where the ESCROW agent acts as a forwarding agent without the knowledge of any encrypted secret whilst still being able to monitor, validate, send, and receive messages.

BRIEF DESCRIPTION OF THE DRAWINGS

These and other aspects of the present disclosure will be apparent from, and elucidated with reference to, the embodiment described herein. An embodiment of the present disclosure will now be described, by way of example only, and with reference to the accompanying drawings, in which.

DETAILED DESCRIPTION

Description of Preferred Embodiment

Figure 1:
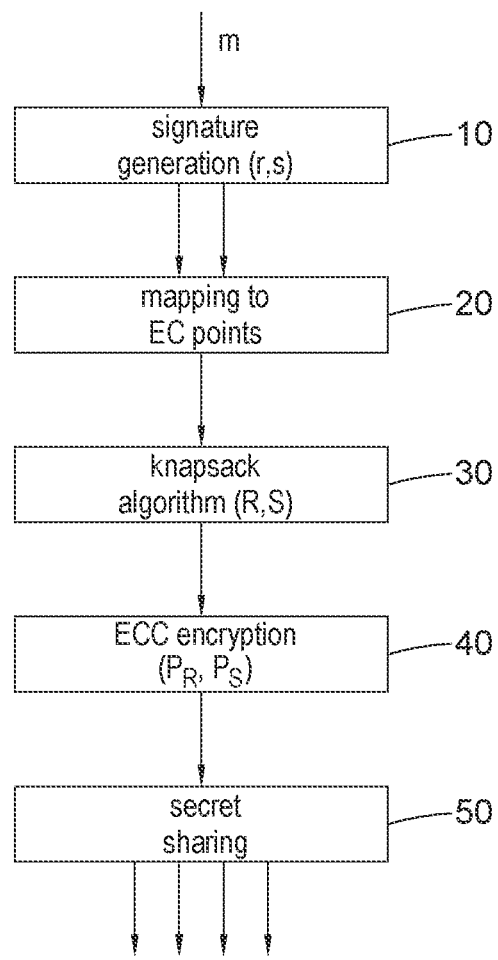
FIG. 1 is a schematic view of a process embodying the present disclosure for distributing shares of a digitally signed message.

Referring to FIG. 1, a process for distributing shares of a digitally signed message among a plurality of participants is described. Initially, a digital message m (where m is a hash value of a message M such as a blockchain transaction) is input to an elliptic curve digital signature algorithm (ECDSA) at step 10. It will be appreciated by persons skilled in the art that the ECDSA generates public and private key pairs, and an ephemeral key which is a random integer, and provides digital signature (r, s) in a manner described in more detail below. The digital signature (r, s) is then mapped to elliptic curve points of an elliptic curve cryptography system common to the participants in a mapping step 20. A first encryption step 30 in the form of a knapsack algorithm is then applied to the elliptic curve points generated at step 20 to generate an encrypted version (R, S) of the digital signature (r, s), and a second encryption step 40 in the form of an elliptic curve cryptography (ECC) encryption is then applied to the encrypted version (R, S) of the digital signature (r, s) to provide a doubly encrypted version ($P_R$, $P_S$) of the digital signature (r, s). Alternatively, the first encryption step 20 can be an elliptic curve cryptography (ECC) encryption step and the second encryption step 40 can be a knapsack algorithm. Finally, a secret sharing step 50 such as Shamir's secret sharing is applied to the doubly encrypted version ($P_R$, $P_S$) of the digital signature (r, s). The ECC encryption can be by means of the Koblitz method described in greater detail below.

The technique of embodiments of the present disclosure enables the distribution of key shares between participants in a sharing scheme. This further enables a distributed mechanism for the decryption of a message, and message recovery. The same mechanism can be used to encrypt a message. This will be described in greater detail below. The technique uses a knapsack algorithm, for example as disclosed in "Different Approaches to Solve the 0/1 Knapsack Problem", Maya Hristakeva Computer Science Department Simpson College Indianola, IA 50125 hristake@simpson.edu, to optimise data packing problems in order to enable the key shares to be packed and distributed as efficiently as possible.

All variants of the Knapsack algorithm and standard solutions as defined in "Different Approaches to Solve the 0/1 Knapsack Problem", Maya Hristakeva Computer Science Department Simpson College Indianola, IA 50125 hristake@simpson.edu perform some variant of a search over a configuration space. By the use of the Stern series to seed the proportions with which the knapsack algorithm is initialised, the search of the configuration space can be made systematic, and exhaustive. This effects operational efficiency of the algorithm because the Stern series can be used to generate all possible rational fractions just once. If the fractions are constrained to be values less than one, they can be used as proportions of packing by the knapsack algorithm, and this constitutes an exhaustive search over all the possible proportions of the sharing of the keys. The signature generation is performed from an arbitrary data message.

Advantages of the Preferred Embodiment

Bitcoin allows for the digital signing of messages in its current format. The introduction of the proposed knapsack ECC methodology of the present disclosure extends this to allow signature retrieval and decryption, as described in greater detail below. Consequently the same mechanism can be used for message retrieval.

In the scheme of the present disclosure, a ciphertext of a signature can be sent to a group of verifiers who can then decrypt the ciphertext following a (t, n) threshold scheme in which any t of n verifiers in the group can decrypt and recover the message, for example as described in Hsu C.L and Wu T. C. (1998), Authenticated Encryption Scheme with (t, n) Shared Verification', IEEE Proceedings—Computers and Digital Techniques, Vol. 145, no. 2, pp. 117-120. This improves the secrecy of data transmission and allows for the integration of encrypted sessions associated directly with bitcoin exchanges.

Elliptic curve cryptography (ECC), for example as described in Koblitz N. (1987), 'Elliptic Curve Cryptosystems', Mathematics of Computation, pp 203-209, provides a secure method of exchanging encrypted information. ECC (unlike other known encryption methods such as RSA) does not require domain parameters to be kept secret. Some applications for this procedure will include this indication of public keys with the simultaneous verification of a self-certified public key crypto system. With the introduction of a knapsack algorithm, the scheme of the present disclosure introduces nonlinearity into the encryption process. The nonlinearity is created because the key information constituent to the encryption process is packed in a space efficient manner rather than the order in which the information is used. This provides a higher level of security for the encrypted message that is put into the knapsack algorithm before sending to the receiver. The receiver can then use a reverse knapsack process followed by decryption to recover the message.

The initial domain parameters are set within the bitcoin protocol. The message exchange used within this scheme can be used as a secure authentication mechanism with the ID being based on the user's bitcoin keys. This allows for a challenge response mechanism between the user and a server, for example as described in Nyberg K. and Rueppel R.A. (1993), 'A New Signature Scheme Based on DSA giving message Recovery', ACM Computer and Communications Security, Vol.1, pp.58-61.

The base public key held by the client can be extended using the multi-signature method detailed below.

In this way, the public key of the client can be recalculated as needed and for each authenticated session, for example as described in Huang, et al., "An FPGA Implementation of Elliptic Curve Cryptography for Future Secure Web Transaction", Conference Paper, January 2007. The creation of a digital signature within the bitcoin transaction follows the standard ECDSA (r,s) signing process.

Encryption Method

Figure 2:
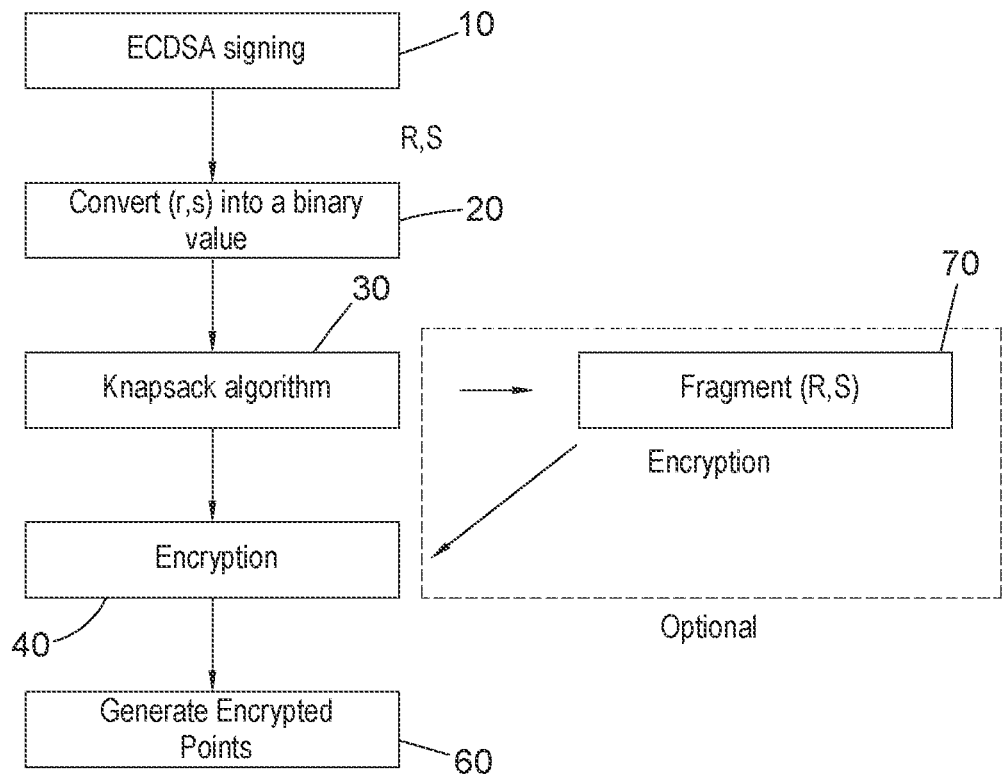
FIG. 2 is a detailed representation of part of the process of FIG. 1.

Referring to FIG. 2, the flow of information for the process for encryption of the message in general is described. It can be seen that there is an optional branch 70 through the information flow. The optional branch 70 makes it possible to further enhance the security of the encryption method by fragmenting the (R,S) pair before performing the knapsack encryption. This is detailed below.

ECDSA Signing

Figure 3:
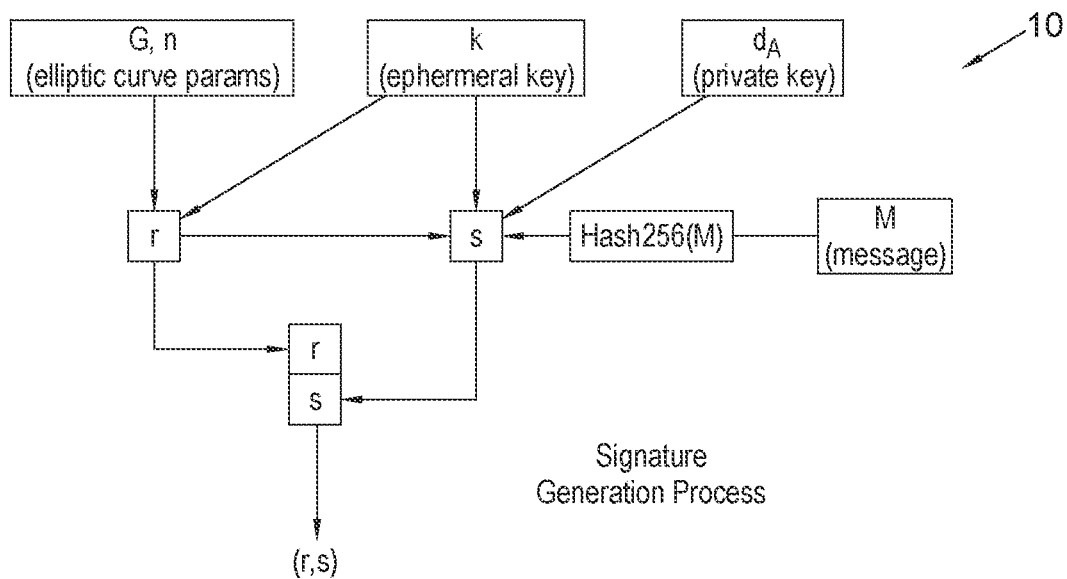
FIG. 3 shows the signature generation step of the process of FIG. 1.

Referring to FIG. 3, the digital signature step 10 of FIGS. 1 and 2 is shown in more detail. As with the standard process followed within bitcoin, the message (M) which happens to be the exchange part of the transaction is signed by the sender of the message and incorporates the receivers address unless a special form of open signature is created where any miner can claim the transaction. The computation of the r value in the ECDSA signature is detailed below. If the value r is equal to 0, then another random number k is chosen in the computation of the value s as described below.

$$R_{x,y} = k \otimes G \quad \text{Eq(1)}$$

$$r = R_x$$

$$s = k^{-1}(m + d_A \cdot r) \bmod n \quad \text{Eq(2)}$$

Where $d_A$ is the private key of the sender.

Bitcoin uses the SHA256 algorithm and signs the hash of the message such that:

$$m = \text{Hash256}(M).$$

The signature generation process is displayed in FIG. 3. The digital signature from the bitcoin transaction (r,s) is then used as input to a knapsack algorithm at step 30 (FIGS. 1 and 2) with a defined knapsack series as described in more detail in Rajaram Ramasamy R, Prabakar M.A, Devi M.I, and Suguna M (2009), 'Knapsack Based ECC Encryption and Decryption', International Journal of Network Security, Vol.9, no.3, pp. 218-226. This leads to the creation of an encoded value (R, S) that is then encrypted using ECC at step 40. This returns the encrypted points ($P_R$, $P_S$) that are related to the values R and S.

The process of converting (r, s) using the knapsack algorithm is shown in detail in method 1 below. The series used in a knapsack algorithm should be a super increasing sequence, which makes the problem easier to solve. A super increasing sequence is defined as one where the next term of the sequence is greater than the sum of all preceding terms. To solve a super increasing knapsack series, the total weight of the knapsack is compared with the largest weight and sequence. Where the total weight is lower than the largest weight, it is not in the knapsack. Where the total weight is greater than the largest weight it is in the knapsack. The algorithm subtracts the largest weight from the total weight and compares this with the next highest number. This process is repeated until the total reaches a value of zero. In the event that the total does not reach zero there is no solution. This is a property of a super increasing sequence.

Knapsack Algorithm Using Stern Series

The general knapsack problem and algorithmic solutions are described in "Different Approaches to Solve the 0/1 Knapsack Problem", Maya Hristakeva Computer Science Department Simpson College Indianola, IA 50125 hristake@simpson.edu. It can be seen that all of the standard solutions to the knapsack problem involve searching over a configuration space. A variant of the knapsack algorithm is defined below. The 'knapsack series' in this algorithm is computed by multiplying an integer K (see below for definition of K) values where 'p' is a prime (the order of the elliptic curve) in situ used in the modular arithmetic and 'k' is a secret integer (the ephemeral key) with $m_L$ being the length of the binary bitstring. The value 'v' is unique to each authenticated client and the new ephemeral value k is maintained as a secret.

A modified Stern series is used to reduce time complexity. Stern series are described in greater detail in Reznick (2008), 'Regularity Properties of the Stern Enumeration of the Rationals', Journal of Integer Sequence.

The value, K=Hash(k) is used in the reverse knapsack algorithm. It is computationally infeasible to determine k from the hash value K.

Knapsack Algorithm

Figure 4:
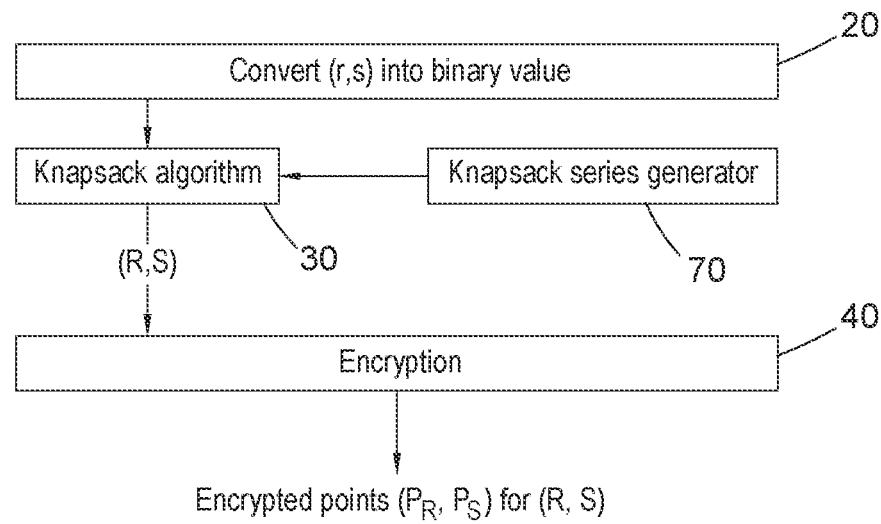
FIG. 4 shows the encryption steps of the process of FIG. 1.

Here the knapsack algorithm shown in step 30 of FIGS. 1, 2, and 4 is described in detail.

To begin, a series is defined $$a_i = 1, v, v^2, \ldots, v^{m_L} \text{ where } i \in \{0, \ldots, m_L\}.$$

v is computed by multiplying v=p+K where p is a 'prime integer' as used in the modular arithmetic and K=Hash(k) is the secret integer. L is the length of the binary bit string.

The value v is unique to each key and hence address, and is updated on each new deterministic exchange.

The K=Hash(k) value should be sent with the signature (r,s) to be used in the reverse knapsack algorithm. This should be sent between the parties using a standard multi-signature method (see below). A series of random values can be generated using the method and a multi-signature method (see below) not just the ephemeral k value used as a random integer.

A modified Stern series is used in the knapsack algorithm as this reduces time complexity by ordering the rational values between 0 and 1, making the rational values easy to search.

The Stern sequence (as described in more detail in Stern, M. A. "Über eine zahlentheoretische Funktion." J. reine angew. Math. 55, 193-220, 1858) is:

$$Stern(1) = 1$$

$$Stern(v) = Stern(v/2) - \text{if } v \text{ is even}$$

$$Stern(v) = Stern((v-1)/2) + Stern((v+1)/2) - \text{if } v \text{ is odd}$$

The ratio between values in the Stern sequence can be used to create a binary tree where the leaves constitute all the rational fractions. This is the Stern-Brochet tree. The set of rational values once enumerated can then be traversed in order of size. The subset of rational values that are less than or equal to one can then be considered. It is this enumeration and ordering which can be used to improve the searching efficiency of the knapsack algorithms.

Consider the binary tree generated by the iteration a, b→a, a+b; a+b, b, (1) starting from the root 1 1. The numbers a, a+b and a+b, b are called the left and the right child of a, b, respectively; a b is also called the mother of its children. The notion of generation by induction is defined as follows: the root 1, 1 forms the first generation; the (n+1) generation is the set of all children of elements of the n-th generation. The binary tree obtained from this iteration is called the Calkin-Wilf tree.

The mechanics of the Stern-Brochot tree are detailed below.

According to the knapsack algorithm, R is calculated using Eq (3). The knapsack series is represented by $a_i$ and the binary value of r is represented using $x_i$.

The S value of the system is given using Eq (4).

$$R = \sum_{i=1}^{m_L} a_i \cdot x_i \quad \text{Eq(3)}$$

$$S = \sum_{i=1}^{m_L} a_i \cdot s \quad \text{Eq(4)}$$

The values (R,S) can be encrypted using an elliptic curve function.

Other values can be exchanged for K. These do not need to relate to the original k random value used in signing. However, the integration of K=Hash(k) does allow for additional script forms to be created within bitcoin later. The use of (R,S) creates a form of double encryption. This provides both authentication and confidentiality for subsequent message exchanges. In a similar form to the Menezes-Vanstone elliptic curve algorithm, which is described in Nyberg K. and Rueppel R.A. (1993), 'A New Signature Scheme Based on DSA giving message Recovery', ACM Computer and Communications Security, Vol.1, pp.58-61, the input is fragmented into blocks of around 160 bits. Partial blocks are corrected or fragmented using the ECC algorithm input with the public key of the receiver. An escrow agent or cloud-based server is used for the exchange. Each fragment is also encrypted using the public key of this system.

The signature is sent to the server or other cloud node. This system could also be an escrow agent or other third party. This third-party or cloud server is unable to decrypt the signature as it requires the private key of the final receiving party. The ECC encryption algorithm is shown below.

In the version of an ECC encryption algorithm of the present disclosure, to start the input is converted to points on elliptic curve using the Koblitz method as described in Koblitz N. (1987), 'Elliptic Curve Cryptosystems', Mathematics of Computation, pp 203-209, and Padma Bh et. al./(IJCSE) International Journal on Computer Science and Engineering Vol. 02, No. 05, 2010, 1904-1907 Encoding And Decoding of a Message in the Implementation of Elliptic Curve Cryptography using Koblitz's Method.

Definition of Stern-Brochet Tree

In this section how the rationals can be generated using the Stern-Brochet Tree is described.

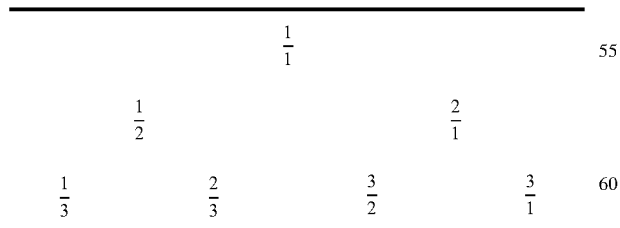

It can be seen from the above schematic that the rational numbers can be arranged in the form of a tree. The relationship between the leaves in the tree is that they all come from the top element, namely (1/1).

By considering this value as a vector and multiplying this by either a left matrix L or a right matrix R, successive leaves on the tree can then be generated. The matrices L and R are defined as follows:

$$I = \begin{matrix} 1 & 0 \\ 0 & 1 \end{matrix}$$

$$L = \begin{matrix} 1 & 0 \\ 1 & 1 \end{matrix}$$

$$R = \begin{matrix} 1 & 1 \\ 0 & 1 \end{matrix}$$

And the structure that emerges is as follows:

|     |     | I   |     |     |
| --- | --- | --- | --- | --- |
|     | IL  |     | IR  |     |
| ILL | IRL | IRL | IRR |     |

By recursively applying the matrices R and L it can be seen that further branches of the tree can be generated. The terms at any given level of the tree can then be read from left to right, and an ordering of the rational numbers can be generated. Those numbers to the left of the centre line (aligned with the matrix I) have a value between zero and unity. Those to the right of the centre line have a value greater than unity.

Multi-Signature Method

In this section the mechanism for multi-signature using ECSDA as the base technology is described.

Technical Specification

For clarity, the following description employs an example whereby the two parties involved in the secret sharing are an internet-based service provider of some kind (henceforth the Server) and a client of the Server (henceforth the Client). The method described is generalizable for any two parties (for example see variation V2).

It is assumed that each party has the capacity to perform ECC operations. In practice 'naïve' Clients may be using software provided by the Server for the purpose, or provided by a third-party provider of cryptographic services (for example, a bitcoin eWallet).

Phase I: Registration

1) Each party agrees on a standard ECC system such as secp256k1 (as used by the bitcoin system), using a common generator, G.
2) Server generates a public/private key pair using secp256k1 and publishes their public key (for example, by making it visible on their official website):

Server Private key 1=$V_{MS}$ (Kept secret by the Server)

Server Public key 1=$P_{MS}$ (Made publicly known)

Where:
V stands for a PRIVATE key (kept secret by the owner of the key)
P stands for PUBLIC key (known to all)
In the subscript:
M indicates the 'master key'
S indicates that the key belongs to the Server Note that in ECC the public key is derived from the private key by using elliptic curve point multiplication as follows:

$$P_{MS} = V_{MS} \times G$$

The private key is a random integer within the allowable range specified by the ECC system.

a. Client generates public/private key pair using secp256k1:

Client Private key 1=$V_{MC}$ (Kept secret by the Client)

Client Public key 1=$P_{MC}$ (This is the Client's master key)

Again:

$$P_{MC} = V_{MC} \times G$$

b. Client registers their master public key ($P_{MC}$) at the Server. This would occur, for example, when the Client signs up with the Server as an ongoing user of their services. The Client also has access to the Server's publicly available master public key, $P_{MS}$.

The registration phase occurs once only as an initial set-up. Henceforward the master keys will be reused in a secure manner to generate single-use symmetric cryptographic keys.

Phase II: Session Initiation

3) Client creates a 'message' to send to the server, and uses a standard algorithm to create a hash of the message resulting in a 256-bit integer:

Message = $M$  (UnixTime + Nonce)

Message Hash = $SHA-256(M)$  0

The choice of message is arbitrary for the purposes of generating the shared secret, but the selection of (UnixTime+Nonce) will be useful for certain planned applications (see embodiment 1).

4) Client calculates a secondary private key as follows:

Client's Private key #2 = $V_{2c}$ = $V_{MC} + SHA-256(M)$  Scalar Addition

It should be noted that in this case the secondary private key is not a random number but is deterministically derived from the master public key. Using this method, its paired public key ($P_{2C}$) is derivable from the Client master key ($P_{MC}$), as follows:

$$\begin{aligned} P_{2C} &= V_{2C} \times G & \text{(by definition)} \\ &= (V_{MC} + SHA-256(M)) \times G & \text{(by subsitution of } V_{2C}\text{)} \\ &= V_{MC} \times G + SHA-256(M) \times G & \text{(ECC algebra is distributive)} \\ &= P_{MC} + SHA-256(M) \times G & \text{(as } V_{MC} \times G = P_{MC} \text{ by definition)} \end{aligned}$$

It should be noted that the '+' operator refers to elliptic curve point addition.

Thus, although the Client's secondary private key ($V_{2C}$) remains secret, the secondary public key is easily derivable given knowledge of the master key and the message M.

5) Client signs the message M with $V_{2C}$ and sends this to the Server:

Signed message = $Sig - V_{2C} <M>$

ECDSA, the Elliptic Curve Digital Signature Algorithm (ECDSA), is described in greater detail in:
https://en.wikipedia.org/wiki/Elliptic_Curve_Digital_Signature_Algorithm;
http://cs.ucsb.edu/~koc/ccs130h/notes/ecdsa-cert.pdf.

This step represents the only transmission required to both establish a shared secret and initiate a secured communication session between the Client and the Server. The Server will be using the received message M to generate their own secondary public/private key pair. This fact allows the Client to immediately calculate the Server's secondary public key:

6) Client calculates Server's secondary public key ($P_{2S}$) using the same technique as in step 4):

$$P_{2S} = P_{MS} + SHA-256(M) \times G$$

7) Server receives Client message and independently calculates the hash of M=SHA-256(M).
8) Server calculates Client's secondary public key ($P_{2C}$) as per the formula in step (4).
9) Server validates the Client's signature (Sig-$V_{2C}$) against the calculated $P_{2C}$.

This is described in more detail at:
https://en.wikipedia.org/wiki/Elliptic_Curve_Digital_Signature_Algorithm;
http://cs.ucsb.edu/~koc/ccs130h/notes/ecdsa-cert.pdf.

At this point, the Server may also perform further checks based on the content of the message M as per any agreed conditions (for example as in embodiment 1).

10) Server calculates a secondary private key as follows:

$$V_{2S} = V_{MS} + SHA-256(M)$$

It can be verified that $V_{2S}$ is paired with $P_{2S}$ using the same technique as in step 4). It should be noted that the Server's secondary private key ($V_{2S}$) remains secret, known only to the Server.

11) Client and Server now have each other's secondary public keys and can each independently calculate the shared secret S using their own secondary private keys as follows:

Server calculates $S = V_{2S} \times P_{2C}$

Client calculates $S = V_{2C} \times P_{2S}$

The verification that the two calculations result in the same value is as follows:

$$\begin{aligned} (i)\ V_{2S} \times P_{2C} &= V_{2S} \times (V_{2C} \times G) \\ &= (V_{2S} \times V_{2C}) \times G \\ (ii)\ V_{2C} \times P_{2S} &= V_{2C} \times (V_{2S} \times G) \\ &= (V_{2C} \times V_{2S}) \times G \end{aligned}$$

ECC algebra is commutative, therefore:

$$(V_{2S} \times V_{2C}) \times G = (V_{2C} \times V_{2S}) \times G$$

Thus equations (i) and (ii) are equivalent.

The shared secret S is in the form of an elliptic curve point, $(x_S, y_S)$. This can be converted into any standard key format using standard publicly known operations as agreed by both parties.

For example, the $x_S$ value is a 256-bit integer that could itself be used as a key for $AES_{256}$ encryption. It could also be converted into a 160-bit integer using RIPEMD160 0 for any applications requiring this length key. Note that once the shared secret S has been calculated the secondary private keys ($V_{2C}$ and $V_{2S}$) do not need to be kept and need never be stored (although, depending on the particular application, they could be stored provided they are kept as secure as the master private keys). Furthermore, the shared secret itself need exist only for the duration of a communications session and can be discarded immediately following a session without ever storing it (though it can be recalculated at any time).

Phase II in this protocol can be repeated many times to generate successive shared secrets for single-purpose usages. Alternatively, the same shared secret can be re-used. In the latter case, for security, the actual secret will not be stored as it is re-calculable from the publicly known information and the existing secretly kept private keys (for example, as in embodiment 2).

Method 1—Knapsack Algorithm

In this section is described how the knapsack algorithm of step 30 of FIGS. 1, 2, and 4 can be used to optimally pack the ECDSA signatures, as described in more detail below, under the heading "Further extension of the knapsack procedure". As stated above the non-linear packing procedure of the knapsack algorithm adds security to the key shares.

Input: (r,s)
  Knapsack series
Output: (R,S) In form of large integer.
Method:
  1) Convert (r,s) into binary form
  2) Generate Knapsack series
  3) Calculate (R,S)

Signature Extensions

The method can be extended past the signing process used within bitcoin through the signing of the entire message. In this method, the message to be shared and encrypted between parties is digitally signed using the process deployed within bitcoin without the message hash. That is the entire message is signed creating a larger version of the (r,s) signature pair.

The knapsack algorithm is again used to encode the (R,S) value. The use of the message hash is preferable in most instances but there are use cases where the entire signed message could exist.

The (R,S) value should be fragmented into blocks before the dual encryption process is conducted using the private key of the sender and the public key of the server or escrow agent.

When the server has received the signature, it decrypts it using the private key it maintains. It then encrypts this using the public key of the end recipient. The signature is sent from the server or agent to the receiver following this process.

Implementation Details of ECC Algorithm for a Single Character

The method is described for encrypting a single character by means of the ECC encryption step 40 of FIGS. 1, 2, and 4, and this can be generalised to a stream of characters.

From an elliptic curve a base point G is chosen.

G has [x, y] coordinates which satisfy the equation $y^2 = x^3 + ax + b$.

The base point minimises x, y values whilst satisfying the EC, i.e. is the point on the elliptic curve which minimises the x, y values.

In the ECC method a random integer k(k<p) is selected, which needs to be kept secret. Then kG is evaluated, by a series of additions and doublings, as is standard in elliptic curve algebra.

The source is designated as host A, and the destination as host B.

The private key of the host B is selected, called $n_B$. k and $n_B$ can be generated by random number generators to give credibility.

The public key of B is evaluated by $$P_B = n_B G. \quad (3)$$

In order for A to encrypt and transmit a character of the alphabet to B, he does the following.

If A wants to transmit the character 'S', for example.

Then the ASCII value of the character 'S' is used to modify an arbitrary point $P_m$ as follows:

$$P'_m = S P_m$$

$P_m$ is an affine point, i.e. an arbitrary point of origin for the ECC calculations and encodings. This is selected different from the Base point G, so as to preserve their individual identities. $P'_m$ is a point on the elliptic curve. The coordinates of the point $P'_m$ should fit into the elliptic curve.

This transformation is done for two purposes. Firstly, the single valued ASCII is transformed into a x,y co-ordinate of the EC. Second it is completely camouflaged from the would-be hacker.

As the next step of ECC, it is necessary to evaluate $kP_B$, where $P_B$ is a public key of user B. For a quick convergence of the result, an optimal number of doubles and additions in series should be planned, depending on the value of k. The encrypted message is then derived by adding $P'_m$ to $kP_B$, that is, $P'_m + kP_B$.

This yields a set of $x_2, y_2$ coordinates. Then kG is included as the first element of the encrypted version which is another set of $x_1, y_1$ coordinates. Hence the entire encrypted version for purposes of storing or transmission consists of two sets of coordinates as follows:

$$C_m = (kG, P'_m + kP_B)$$

$$kG \rightarrow x_1, y_1$$

$$P'_m + kP_B \rightarrow x_2, y_2$$

The modified plaintext has therefore been encrypted by application of the ECC method.

Further Extension of the Knapsack Procedure

The knapsack procedure introduces thorough diffusion and confusion a defence against attempts at brute force attacks.

The knapsack procedure uses a series of vectors called $a_i$.

There are several ways of generating these vectors. For example, it is possible to have a series of powers of n, as follows:

$$a_i = 1, n, n^2, n^3, \ldots, n^m \text{ where } 1 \leq i \leq m.$$

Here, n is a random integer less than 10 for simplicity, or computed involving the p and k integers. p is a prime integer used in the modular arithmetic, k is the secret integer and m is the length of the binary bit string.

Messages are encrypted according to the Knapsack process as follows:

Say $x_i$ is one of the coordinate points, which can be represented in its binary form as: $x_i = b_1, b_2, \ldots, b_m$ $1 \leq i \leq m$, where the terms $b_1, b_2, \ldots$ are the binary coefficients of the expanded term.

According to the knapsack algorithm, a cumulative sum $S[x_1]$ is calculated, which is defined as the vector dot product of the binary form of the $x_i$ coordinate point and the series defined above, as follows:

$$S[x_1] = \sum_{i=1}^{m} a_i, x_i$$

In the final encrypted version the coordinate $x_i$ is replaced by its equivalent $S[x_1]$.

Similarly, other coordinates like $y_1, x_2, y_2$ are transformed by the knapsack algorithm, so that the encrypted message shall now be represented as:

$$C_m = ((S[x_1], S[y_1]), S[x_2], S[y_2])).$$

It should be noted that two pairs of integers represent just one character in a message. Accordingly, a total message will be represented by a number of pairs of integers equal to the number of characters in the message.

The recipient B has all relevant information for reversing the knapsack procedure and to recover the bit pattern of the coordinates. For example B knows the $a_i$ series, his own secret key $n_B$, and the base point G, a, b, p values of the elliptic curve. B receives the encrypted message, $C_m = ((S[x_1], S[y_1]), (S[x_2], S[y_2]))$.

Figure 5:
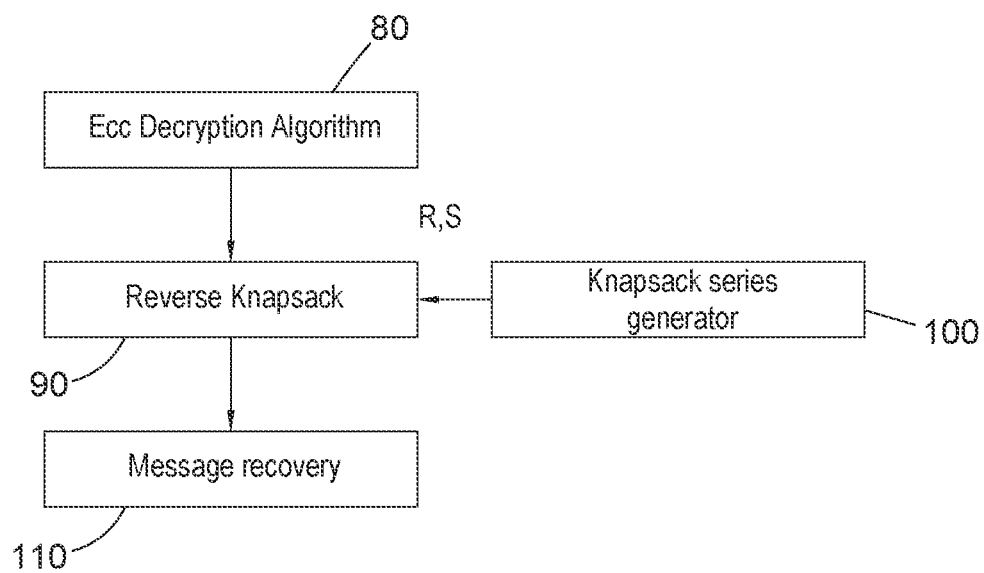
FIG. 5 shows a message recovery process for obtaining the digital signature encrypted by the process of FIG. 1.
Figure 6:
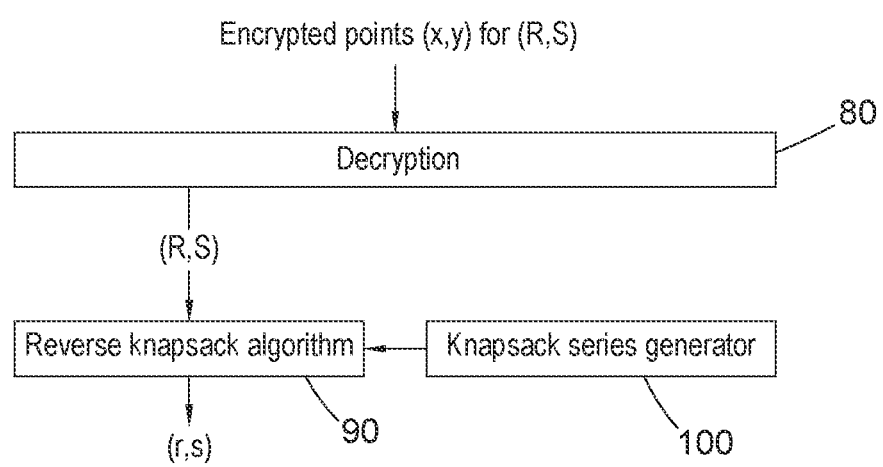
FIG. 6 shows a decryption process for use in the process of FIG. 5.

In order to reverse the knapsack process, i.e. in step 90 of FIGS. 5 and 6, by taking one example, consider:

$$S[x_1] = \sum_{i=1}^{m} a_i x_i,$$

which is the knapsack representation of $x_1$. The $x_1$ value is recovered in an iterative fashion as follows:

$S[x_1] - n^m$ is determined.

If this value is positive, that is, $S[x_1] - n^m > 0$, then a binary bit 1 is assigned at the $(m)^{th}$ position, and the current value is replaced by $S[x_1] = S[x_1] - n^m$. If however the value is negative, then a 0 bit is assigned and the value of $S[x_1]$ remains unchanged.

$n^{m-1}$ is now subtracted from the current value of $S[x_1]$. Depending upon whether it is positive or negative, a value 1 or 0 is assigned at the relevant bit position. This subtraction process is continued until the $a_i$ series is exhausted. This will recover the binary bit pattern of $x_1$.

These procedures are then repeated for $y_1, x_2,$ and $y_2$. It should be recalled that kG is represented by $x_1, y_1,$ and $P'_m + kP_B$ is represented by $x_2, y_2$. In order to extract $P'_m$ from $P'_m + kP_B$, B applies his secret key $n_B$ and multiplies kG so that, $$n_B kG = kP_B.$$

Subtracting this from $P'_m + kP_B$, to get $P'_m$ as follows:

$$P'_m = P'_m + kP_B - nB_K G.$$

The subtraction also involves ECC doubling and addition where the only difference is that the negative term will have its y coordinate preceded by a minus sign. The expression of determining the slope, new values of $x_R$, $y_R$ are the same. Wherever y figures, it is substituted as $-y$.

This will yield $P'_m$. The ASCII value of 'S' can then be retrieved from $P'_m = S \, P_m$, for example from a look-up table of elliptic curve encryptions of ASCII values.

ECC Encryption Algorithm

In this section the method for combining the ECC encryption algorithm, Koblitz algorithm, and knapsack algorithm is described.

Input: (R,S)
   Receiver's Public Key $P_B$
   Random Integer K=Hash(k) as used by sending party
   Elliptic curve base Point G
Output: Encrypted point for each of R and S
Method:
The method for $R \in Z_n^*$ is explained. The method for S is identical.

1) Koblitz's method is used in the mapping step 20 of FIG. 1 to identify a unique elliptic curve point corresponding to R. This is achieved by identifying a point on the elliptic curve with x-coordinate $x \in Z_p$ such that $\lambda R < x \leq \lambda R + 1$ for some constant $\lambda$ that is agreed between both sender and receiver. If such a point does not exist, then we try $\lambda R < x \leq \lambda R + 2$ and so on.
2) The sender generates a random number K. This may be chosen to be K=Hash(k).
3) The sender sends the encrypted cypher text $$C = (K \otimes G, x + K \otimes P_B)$$

to the receiver. The point $x + K \otimes P_B$ is the encrypted point corresponding to R whilst the point $K \otimes G$ allows the receiver to decrypt the point, as described in more detail below.

Decryption

The flow of information in the decryption procedure of step 80 of FIGS. 5 and 6 is as follows.

The mechanics of each of the steps are described in the remainder of this Decryption section.

Message Recovery

The message signature received by the server can be decrypted using the server's private key. Once decrypted, the message is encrypted using the secret key that is shared between the cloud server and the final recipient. This allows the server or agent to act as an escrow or forwarding agent without gaining any knowledge of the encrypted secret while still being able to monitor and validate the sending and receiving parties. The exchange of values is done over a secret sharing method, described in more detail below in the section "secret value sharing."

The cloud server can also act as a certification agency in the creation of ID-based encryption schemes. The ECC decryption algorithm is detailed below. The receiving party is able to recover (R,S) using their private key which is input to the ECC decryption algorithm. This allows the receiver to decode the elliptic curve point back to a message.

ECC Decryption Algorithm

Operation of the ECC decryption algorithm of step 80 of FIGS. 5 and 6 is shown.
Input: Cypher text of the form C=(K⊗G, x+K⊗$P_B$) from the sender.
The recipient's private key $d_B$
Output: Decrypted data R (or S)
Method:
1) Where KG is the first point and x+K⊗$P_B$ is the second point
2) (second point)−$d_A$·(first point)=x+K⊗$P_B$−$d_B$·K⊗G=x is calculated
3) Koblitz's method is used to decode the point. This is achieved by identifying the largest integer R less than (x−1)/λ.

The values (R, S) are used as input to the reverse knapsack algorithm in order to recover the values (r,s) through an iterative process with the use of the value, $$R-n^{m_L}$$

Where the value R−$n^{m_L}$>0 is positive, a binary bit one is assigned at the $m_L^{th}$ position.
The current value of R is then set as:

$$R = R - n^{m_L}$$

In the instance where the result is negative, a bit zero is assigned and the value of R remains unchanged. Next, R−$n^{m_L}$ is subtracted from the current value of R. Switching the binary value 0 or 1 as defined above continues this iterative process until the series has no further value. The result returned is the binary bit pattern associated with the value R. Conversion back to the binary form of (r,s) is then carried out and equation 5 is used to complete message recovery.

The message can then be recovered using equation 5. The message can be in ASCII format or any other encoding including non-text input.

$$m = r - (sG + H(r) \otimes P_B) \bmod n \qquad \text{Eq (5)}$$

Secret Value Sharing

A fundamental problem in cryptographic systems is the establishment of a shared secret between parties across an insecure network. For example, in symmetric key cryptography as described in more detail at https://en.wikipedia.org/wiki/Symmetric-key_algorithm, such as is used by AES, described in more detail at https://aesencryption.net/, a single secret key is shared by two parties. It has the disadvantage that the secret key must somehow first be securely transmitted between the two parties. As the transmission of keys is usually done electronically over communications systems such as the internet, the sharing step is a potentially catastrophic vulnerability. As the symmetric key protocol is simple and widely used there is a need for an ability to share a secret key securely across an insecure network.

Existing protocols such as the Diffie-Hellman Key Exchange (described in more detail at https://en.wikipedia.org/wiki/Diffie%E2%80%93Hellman_key_exchange) and the Three Pass Protocol (described in more detail at https://en.wikipedia.org/wiki/Three-pass_protocol) enable the secure sharing of a secret across insecure networks. However, these methods are computationally expensive in cases where new secrets are be continuously generated and shared. The present embodiment provides an efficient and less costly method for secure secret sharing. Furthermore, the technique described allows the generation and convenient management of multiple secure secret keys based on a single master key.

The main elements of the process of the present embodiment are as follows:
1. The method utilises Elliptic Curve Cryptography (ECC) (described in greater detail at https://en.wikipedia.org/wiki/Elliptic-curve_cryptography) and the properties of Elliptic Curve operations. Several standards exist for cryptography using elliptic curves as described by the independent body known as the Standards for Efficient Cryptography Group (SECG) (http://www.secg.org/).
2. ECC is used to generate pairs of cryptographic keys for asymmetric cryptography (described in more detail at https://searchsecurity.techtarget.com/definition/asymmetric-cryptography), in which one key is made publicly available and the other is kept secret. The present embodiment enables each party to independently calculate the same secret key based on their own asymmetric key pair as generated by an agreed ECC standard such as secp256k1. The security derives from the fact that the shared secret is calculated by each party but never transmitted.
3. The efficiency derives from consolidating several steps into a single step and from using a less computationally expensive calculation to derive new keys. After an initial set-up phase in which master keys are established, each subsequent creation of a new secret key is efficient and repeatable.

For clarity, the following description employs an example whereby the two parties involved in the secret sharing are an internet-based service provider of some kind (henceforth the Server) and a client of the Server (henceforth the Client). The method described is generalizable for any two parties (for example see variation V2 below).

It is assumed that each party has the capacity to perform ECC operations. In practice 'naïve' Clients may be using software provided by the Server for the purpose, or provided by a third-party provider of cryptographic services (for example, a bitcoin eWallet).

Phase I: Registration

12) Each party agrees on a standard ECC system such as secp256k1 (as used by the bitcoin system), using a common generator, G.

13) Server generates a public/private key pair using secp256k1 and publishes their public key (for example, by making it visible on their official website):

Server Private key 1=$V_{MS}$ (Kept secret by the Server)

Server Public key 1=$P_{MS}$ (Made publicly known)

Where:
V stands for a PRIVATE key (kept secret by the owner of the key)
P stands for PUBLIC key (known to all)
In the subscript:
M indicates the 'master key'
S indicates that the key belongs to the Server
Note that in ECC the public key is derived from the private key by using elliptic curve point multiplication as follows:

$$P_{MS} = V_{MS} \times G$$

The private key is a random integer within the allowable range specified by the ECC system.

14) Client generates public/private key pair using secp256k1:

Client Private key 1=$V_{MC}$ (Kept secret by the Client)

Client Public key 1=$P_{MC}$ (This is the Client's master key)

Again:

$$P_{MC} = V_{MC} \times G$$

15) Client registers their master public key ($P_{MC}$) at the Server. This would occur, for example, when the Client signs up with the Server as an ongoing user of their services. The Client also has access to the Server's publicly available master public key, $P_{MS}$.

The registration phase occurs once only as an initial set-up. Henceforward the master keys will be reused in a secure manner to generate single-use symmetric cryptographic keys.

Phase II: Session Initiation

16) Client creates a 'message' to send to the server, and uses a standard algorithm to create a hash of the message resulting in a 256-bit integer:

Message=$M$(UnixTime+Nonce)

Where the choice of message is arbitrary for the purposes of generating the shared secret, but the selection of (Unix Time+Nonce) will be useful for certain planned applications, for example as described in embodiment 1.

$$\text{Message Hash} = SHA - 256(M)$$

Described in more detail at https://hash.online-convert.com/sha256-generator

17) Client calculates a secondary private key as follows:

Client's Private key #2 = $V_{2C}$ = $V_{MC} + SHA - 256(M)$ Scalar addition

It should be noted that in this case the secondary private key is not a random number but is deterministically derived from the master public key. Using this method, its paired public key ($P_{2C}$) is derivable from the Client master key ($P_{MC}$), as follows:

$$\begin{aligned}
P_{2C} &= V_{2C} \times G & \text{(by definition)} \\
&= (V_{MC} + SHA - 256(M)) \times G & \text{(by substitution of } V_{2C}) \\
&= V_{MC} \times G + SHA - 256(M) \times & (ECC \text{ algebra is distributive}) \\
&= P_{MC} + SHA - 256(M) \times G & \text{(as } V_{MC} \times G = P_{MC} \text{ by definition)}
\end{aligned}$$

(It should be noted that the '+' operator refers to elliptic curve point addition.)

Thus, although the Client's secondary private key ($V_{2C}$) remains secret, the secondary public key is easily derivable given knowledge of the master key and the message M.

18) Client signs the message M with $V_{2C}$ and sends this to the Server:

$$\text{Signed message} = Sig - V_{2C} < M > \quad \text{ECDSA}$$

(https://en.wikipedia.org/wiki/Elliptic_Curve_Digital_Signature_Algorithm)

This step represents the only transmission required to both establish a shared secret and initiate a secured communication session between the Client and the Server. The Server will be using the received message M to generate their own secondary public/private key pair. This fact allows the Client to immediately calculate the Server's secondary public key:

19) Client calculates Server's secondary public key ($P_{2S}$) using the same technique as in step (4):

$$P_{2S} = P_{MS} + SHA - 256(M) \times G$$

20) Server receives Client message and independently calculates the hash of M=SHA-256(M).
21) Server calculates Client's secondary public key ($P_{2C}$) as per the formula in step (4).
22) Server validates the Client's signature (Sig-$V_{2C}$) against the calculated $P_{2C}$. At this point, the Server may also perform further checks based on the content of the message M as per any agreed conditions (for example see embodiment 1).
23) Server calculates a secondary private key as follows:

$$V_{2S} = V_{MS} + SHA - 256(M)$$

It can be verified that $V_{2S}$ is paired with $P_{2S}$ using the same technique as in step (4). It should be noted that the Server's secondary private key ($V_{2S}$) remains secret, known only to the Server.

24) Client and Server now have each other's secondary public keys and can each independently calculate the shared secret S using their own secondary private keys as follows:

Server calculates $S=V_{2S} \times P_{2C}$

Client calculates $S=V_{2C} \times P_{2S}$

The verification that the two calculations result in the same value is as follows:

$$(i)\ V_{2S} \times P_{2C} = V_{2S} \times (V_{2C} \times G)$$
$$= (V_{2S} \times V_{2C}) \times G$$
$$(ii)\ V_{2C} \times P_{2S} = V_{2C} \times (V_{2S} \times G)$$
$$= (V_{2C} \times V_{2S}) \times G$$

ECC algebra is commutative, therefore:

$$(V_{2S} \times V_{2C}) \times G = (V_{2C} \times V_{2S}) \times G$$

Thus equations (i) and (ii) are equivalent.

The shared secret S is in the form of an elliptic curve point, $(x_S, y_S)$. This can be converted into any standard key format using standard publicly known operations as agreed by both parties. For example, the $x_S$ value is a 256-bit integer that could itself be used as a key for $AES_{256}$ encryption. It could also be converted into a 160-bit integer using RIPEMD160 (http://homes.esat.kuleuven.be/~bosselae/ripemd160.html) for any applications requiring this length key. It should be noted that once the shared secret S has been calculated the secondary private keys ($V_{2C}$ and $V_{2S}$) do not need to be kept and need never be stored (although, depending on the particular application, they could be stored provided they are kept as secure as the master private keys). Furthermore, the shared secret itself need exist only for the duration of a communications session and can be discarded immediately following a session without ever storing it (though it can be recalculated at any time).

Phase II in this protocol can be repeated many times to generate successive shared secrets for single-purpose usages. Alternatively, the same shared secret can be re-used. In the latter case, for security, the actual secret will not be stored as it is recalculable from the publicly known information and the existing secretly kept private keys (for example, as described in embodiment 2).

VARIATIONS

In this section, methods for variations of hashes are described.

V1: Hierarchy of Hashes

Instead of repeating phase II to generate successive single-purpose keys, by prior agreement between the parties, the previously used Message Hash (SHA-256(M)) can be rehashed repeatedly by both parties to establish a hierarchy of hashes. In effect, the hash of a message can be the message for the next generation (M'). Doing this allows successive generations of shared secrets to be calculated without the need for further protocol-establishment transmissions. The second-generation shared secret (S') can be computed as follows.

V1.i Both parties calculate a second generation of the Hash:

$$M' = SHA-256(M)$$
$$Hash' = SHA-256(SHA-256(M))$$

V1.ii Client calculates another generation of the Server's public key:

$$P_{2S}' = P_{MS} + Hash' \times G$$

V1.iii Server calculates another generation of the Client's public key:

$$P_{2C}' = P_{MC} + Hash' \times G$$

V1.iv Both parties calculate a second generation of their own private keys:

$$V_{2C}' = V_{MC} + SHA-256(M')$$
$$V_{2S}' = V_{MS} + SHA-256(M')$$

V1.v. Server and Client each calculate the next generation shared secret:

Server calculates $S' = V_{2S}' \times P_{2C}'$

Client calculates $S' = V_{2C}' \times P_{2S}'$

Further generations (S", S'", etc.) can be calculated in the same way to create a chain hierarchy.

This technique requires that both the Server and the Client keep track of the original Message or the originally calculated hash, (SHA-256(M)), and to which party it relates. As this is publicly known information there are no security issues regarding the retention of this information. Accordingly, this information might be kept on 'hash tables' (linking hash values to public keys) and distributed freely across the network (for example using Torrent). It should be noted that if any individual shared secret in the hierarchy is ever compromised this does not affect the security of any other secret keys in the hierarchy provided the private keys remain secure.

As well as a chain (linear) hierarchy as described above, a hierarchy in the form of a tree structure can be created. Tree branching can be accomplished in several ways, three of which are described here.

(i) Master Key Spawning. First, it should be noted that in the chain hierarchy each new 'link' (Public/Private key pair) is created by adding a multiply rehashed Message to the original master key. That is (showing only the private key for clarity):

(ii)

$$V_{2C} = V_{MC} + SHA-256(M)$$
$$V_{2C}' = V_{MC} + SHA-256(SHA-256(M))$$
$$V_{2CC}'' = V_{MC} + SHA-256(SHA-256(SHA-256(M)))$$

... and so on.

To create a branch any key can be used as a sub-master key. For example $V_{2C}'$ can be used as a sub-master key by adding the hash to it as is done for the regular master key:

$$V_{3C} = V_{2C}' + SHA-256(M)$$
$$V_{3C}' = V_{2C}' + SHA-256(SHA-256(M))$$

(iii) Logical Association. In this method all the nodes in the tree (public/private key pairs) are generated as a chain (or in any other way—as shown in (iii) below) and the logical relationships between the nodes in the tree is maintained by a table in which each node is simply associated with its parent node using a pointer.

(iv) Message Multiplicity. New private/public key pairs can be generated by introducing a new message M at any point in the chain or tree. The message itself may be arbitrary or may carry some meaning or function (e.g. it might be related to a 'real' bank account number, etc.). Of course any new messages must be securely retained.

With a tree structure a host of keys can be provided for different purposes such as authentication keys, encryption keys, signing keys, payment keys, etc., all linked to a single securely maintained master key. Each of these can be used to create a shared secret with another party.

V2: Peer-to-Peer Secret Sharing

The present embodiment can be used between two peers rather than between a Server and a Client. In the example described in the Technical Specification above, the Server acts as a party trusted by the Client. The Server must authenticate the credentials of the Client in order to allow the Client access to their system. The Server does this by validating the Client's signed message. In a peer-to-peer scenario each peer must establish trust with each other—i.e., the 'Client' must also authenticate the credentials of the 'Server'. This can be done by a two-way process, in which both parties perform the message signing and verification steps (step (5)-(9) in the Technical Specification).

In the peer-to-peer scenario, after the Client has sent the signed message M to the Server, the Server uses their calculated secondary private key $V_{2S}$ to sign the same message and send it back to the Client:

$$V2.i \quad \text{Signed message} = Sig - V_{2S} < M > \quad\quad \text{ECDSA}$$

The Client then validates the Server's signature against the Server's secondary public key $P_{2S}$, which they had calculated in step (6).

Figure 7:
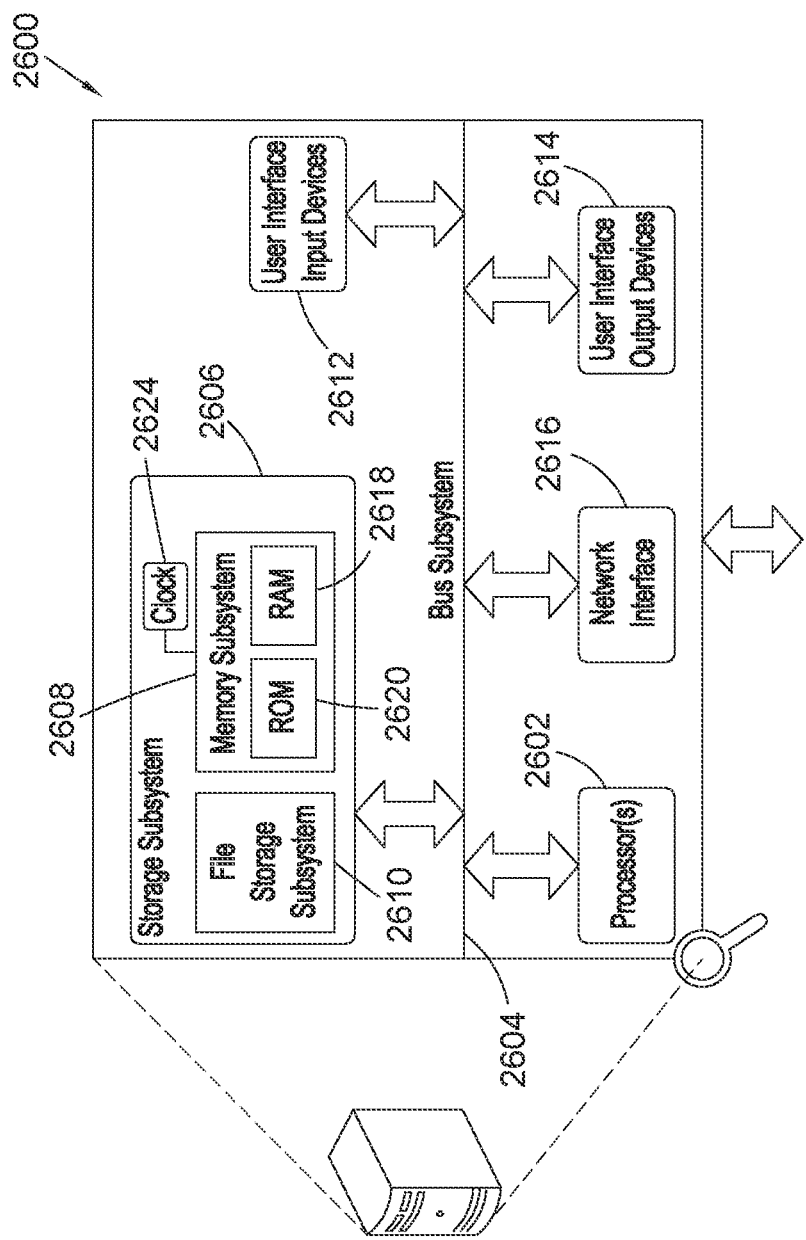
FIG. 7 is a schematic diagram illustrates a computing environment in which various embodiments can be implemented.

Turning now to FIG. 7, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a data server, a web server, a portable computing device, a personal computer, or any electronic computing device. As shown in FIG. 7, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 7 is intended only as a specific example for purposes of illustrating the preferred embodiment of the device. Many other configurations having more or fewer components than the system depicted in FIG. 7 are possible.

It should be noted that the above-mentioned embodiments illustrate rather than limit the disclosure, and that those skilled in the art will be capable of designing many alternative embodiments without departing from the scope of the disclosure as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The disclosure may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

REFERENCES

1. Chen T.S. Huang G.S. Liu T.P. and Chung Y.F (2002), 'Digital Signature Scheme Resulted from Identification Protocol for Elliptic Curve Cryptosystem', Proceedings of IEEE TENCON'02. pp. 192-195
2. Hsu C.L and Wu T. C. (1998), Authenticated Encryption Scheme with (t, n) Shared Verification', IEEE Proceedings—Computers and Digital Techniques, Vol. 145, no. 2, pp. 117-120.
3. Graham, R. L.; Knuth, D. E.; and Patashnik, O. Concrete Mathematics: A Foundation for Computer Science, 2nd ed. Reading, MA: Addison-Wesley, pp. 116-117, 1994.
4. Koblitz N. (1987), 'Elliptic Curve Cryptosystems', Mathematics of Computation, pp 203-209.
5. Nyberg K. and Rueppel R.A. (1993), 'A New Signature Scheme Based on DSA giving message Recovery', ACM Computer and Communications Security, Vol.1, pp.58-61.
6. Rajaram Ramasamy R, Prabakar M.A, Devi M.I, and Suguna M (2009), 'Knapsack Based ECC Encryption and Decryption', International Journal of Network Security, Vol.9, no.3, pp. 218-226.
7. Rajaram Ramasamy R. and Amutha Prabakar M. (2011), 'Digital Signature Scheme with message Recovery Using Knapsack-based ECC', International Journal of Network Security, Vol.12, no.1,pp.15,20.
8. Reznick (2008), 'Regularity Properties of the Stern Enumeration of the Rationals', Journal of Integer Sequence.
9. Stern, M. A. "Über eine zahlentheoretische Funktion." J. reine angew. Math. 55, 193-220, 1858.
10. Different Approaches to Solve the 0/1 Knapsack Problem Maya Hristakeva Computer Science Department Simpson College Indianola, IA 50125 hristake@simpson.edu
11. Huang, et al., "An FPGA Implementation of Elliptic Curve Cryptography for Future Secure Web Transaction", Conference Paper, January 2007.
1a. Symmetric key cryptography: https://en.wikipedia.org/wiki/Symmetric-key_algorithm
2a. AES encryption: http://aesencryption.net/
3a. Diffie-Hellman Key exchange: https://en.wikipedia.org/wiki/Diffie%E2%80%93Hellman_key_exchange
4a. Three Pass Protocol: https://en.wikipedia.org/wiki/Three-pass_protocol
5a. Elliptic Curve Cryptography: https://en.wikipedia.org/wiki/Elliptic_curve_cryptography
6a. Standards for Efficient Cryptography Group (SECG): http://www.secg.org/
7a. Asymmetric cryptography: http://searchsecurity.techtarget.com/definition/asymmetric-cryptography
8a. SHA-256 algorithm: http://hash.online-convert.com/sha256-generator
9a. Elliptic Curve Digital Signature Algorithm (ECDSA): https://en.wikipedia.org/wiki/Elliptic_Curve_Digital_Signature_Algorithm; http://cs.ucsb.edu/~koc/ccs130h/notes/ecdsa-cert.pdf
10a. RIPEMD160 algorithm: http://homes.esat.kuleuven.be/~bosselae/ripemd160.html
4aa. Padma Bh et. al./(IJCSE) International Journal on Computer Science and Engineering Vol. 02, No. 05, 2010, 1904-1907 Encoding And Decoding of a Message in the Implementation of Elliptic Curve Cryptography using Koblitz's Method

What is claimed is:

1. A computer-implemented method for distributing shares of a digitally signed message among a plurality of participants, the method comprising:
    inputting a digital message to an elliptic curve digital signature algorithm to provide a digital signature;
    mapping the digital signature to elliptic curve points of an elliptic curve cryptography system common to the participants;
    a first encryption step, wherein a knapsack algorithm is applied to the elliptic curve points to generate an encrypted version of the digital signature;
    a second encryption step, wherein an elliptic curve cryptography encryption is applied to the encrypted version of the digital signature to provide a doubly encrypted version of the digital signature; and
    applying a secret sharing step to the doubly encrypted version of the digital signature,
    wherein the digital signature is fragmented into a plurality of blocks before applying the knapsack algorithm.

2. The computer-implemented method according to claim 1, wherein the digital message is a hash of a value of a message.

3. The computer-implemented method according to claim 2, wherein the digital message is a blockchain transaction.

4. The computer-implemented method according to claim 1, wherein a series used in the knapsack algorithm is a super increasing sequence.

5. The computer-implemented method according to claim 1, further comprising:
   using a Stern series to seed proportions with which the knapsack algorithm is initialised.

6. The computer-implemented method according to claim 5, wherein the Stern series is a modified Stern series.

7. A computer-implemented system comprising:
   a processor; and
   memory including executable instructions that, as a result of execution by the processor, cause the system to perform any embodiment of the computer-implemented method as claimed in claim 1.

8. A non-transitory computer-readable storage medium having stored thereon executable instructions that, as a result of being executed by a processor of a computer system, cause the computer system to at least perform an embodiment of the method as claimed in claim 1.

* * * * *